United States Patent Office 3,289,747
Patented Dec. 6, 1966

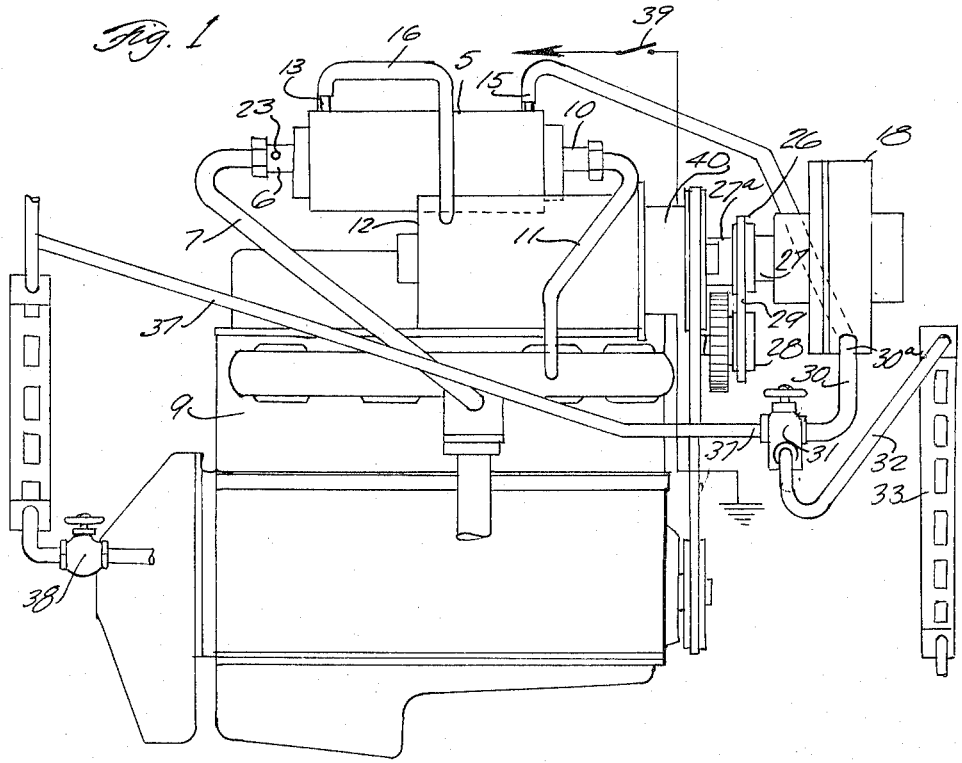
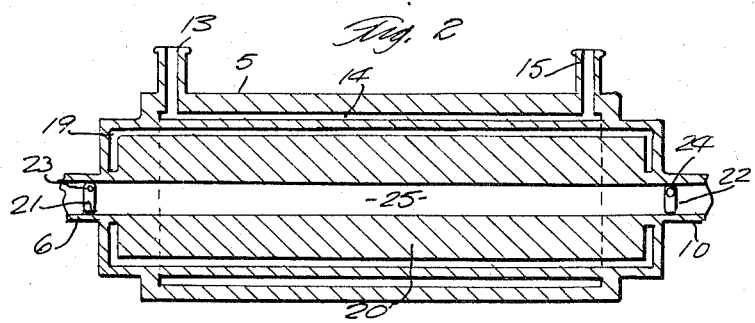
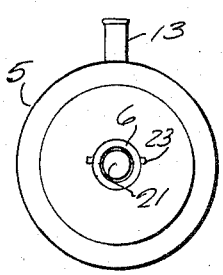
INVENTOR.
MACK HARRIS

3,289,747
HEATING AND STORING HEAT TO POWER A GENERATOR AND A COMPRESSOR IN A VEHICLE
Mack Harris, 214 N. Ash St., Pine Bluff, Ark.
Filed Aug. 10, 1964, Ser. No. 388,465
1 Claim. (Cl. 165—42)

This application is a continuation-in-part of my application Serial Number 285,552, filed May 31, 1963, now abandoned.

The present invention relates to power for driving a turbine to operate a generator and compressor for an air conditioner in a vehicle.

A principal object of the present invention is to power drive a turbine to operate a generator and compressor after a vehicle engine is in operation for a short while, the units are operated without extra fuel, or power.

Another object of the present invention is to power drive a turbine to operate a generator and compressor when vehicle engine is shut off for a long useful period of time to save fuel.

A further object of the present invention is to lessen danger of carbon monoxide poisoning in vehicle compartment while on standby.

These and objects and advantages of the present invention will be fully apparent from the following description when taken in connection with the annexed drawings, in which:

FIGURE 1 is a side elevation view of the heating and storing heat device, connected with a turbine, a compressor, condensers, a generator pulley with generated cutaway, and fragmentary view of a internal combustion engine.

FIGURE 2 is a sectional view, on an enlarged scale, of a detail of the heating and storing heat device shown in FIGURE 1.

FIGURE 3 is a fragmentary plan end view of heating and storing heat device shown in FIGURE 2.

Referring in detail to the drawings in which like numerals indicate like parts through the views, the heating and storing heat device of the present invention comprises, as shown in FIGURE 1, an outer case 5, and an inlet nipple 6 connected by a pipe 7, which has its other end connected to usual manifold 8, which is connected to a general type of internal combustion engine 9. The outlet nipple 10 is connected by another pipe 11, which has its other end connected to manifold 8, the heating and storing heat device preferable disposed so as to be mounted upon the fit to upper one side of a usual compressor 12. The inner parts of heating and storing heat device are shown in FIGURES 2 and 3, comprising an inlet 13, vent 14, and outlet 15, and the outlet conduit 16 of compressor 12 is connected to inlet 13, and conduit 17 is connected to outlet 15 and to a preferable small inlet of a turbine 18. A vacuum chamber 19 is between vent 14 and stored heat part 20 to act as an insulator. The shutters 21 and 22 are fixed to swing freely on pins 23 and 24 in bore 25.

Conveniently connected with my invention a pulley 26 is connected to turbine shaft 27 and the turbine shaft may be mounted to center with end of compressor shaft 27a and fixed to rotate with each other. The pulley 26 is connected to generator pulley 28 by belt 29; a conduit 30 is connected to turbine outlet 30a and to a two-way valve 31, which may control flow of a refrigerant gas by turning it to position so gas may flow through conduit 32, condenser 33, and inner coils 36 in a usual manner in vehicle compartment to cool, or valve 31 may be turned so hot refrigerant gas will flow through conduit 37, which is connected to condenser 36 to heat the vehicle compartment. A valve 38 is connected to restricted outlet conduit of condenser 36 while heating.

To producer power and start my invention to operating a switch 29 of a usual type, is connected to the dashboard (not shown) in a convenient way and control a convenient electric clutch 40, which is rotated by engine 9 and engage the shaft 27a of compressor 12, which rotate turbine shaft 27, pulley 26, and pulley 28 of generator by belt 29. The exhaust gas heat from engine 9 passes through bore 25 by forcing shutters 21 and 22 open. The exhaust gas heat heatup part 20 and heat is stored at a higher temperature than the heat of the compressed refrigerant gas. The vacuum chamber 19 controls the amount of heat by preventing engine heat from over heating the refrigerant gas that is compressed through vent 14, having the turbine 18 connected to remain operating by the flowing super-heated compressed refrigerant gas. After clutch 40 releases the shaft 27a of compressor 12 at a high r.p.m., the turbine continues to operate the compressor and the generator. After the engine is shut off the vacuum chamber 19 is fixed to slow down heat transfer from stored heat part 20, which super heat flowing refrigerant gas until the temperature is nearly balanced with the compressed hot refrigerant. The shutters 21 and 22 swing close to trap heat in bore 25. The vacuum chamber and shutters help to reserve stored heat in part 20 for a long useful period of time while vehicle is on stand-by; also danger of carbon monoxide poisoning lessens, which could seep into vehicle compartment if the engine should continue to run. The power in motion of the turbine helps the flowing gas through its vanes to carry compressor through its compression stroke. The condenser on inside of the vehicle compartment or condenser on outside keep pressure lower on one side of the turbine forcing it to rotate.

The stored heat part of device is a solid material to hold many heat calories. To reserve these calories the vacuum chamber is fixed to let enough calories through to the compressed gas to a temperature slightly higher than the compression stroke of compressor, also the shutters prevent a large amount of heat from escaping from bore. The shutters are made of a heat insulating material.

The turbine 18 operates a generator and compressor of an air-conditioner in a vehicle without extra fuel, or power, after stored heat part of present invention is heated to a certain temperature by heat of vehicle engine. In previous statement, what is meant by temperature is slightly higher than the compression stroke of compresser, meaning the viscosity and conductivity in vacuum chamber keeps the temperature on the vent in heating and storing heat device from zero plus to ten degrees Fahrenheit hotter than the compressed refrigerant gas. This is in connection with heating by the vehicle engine and heating by the stored heat in the device.

It will be understood that the exhaust gas heat gets much hotter than ten degrees Fahrenheit over the compressed refrigerant gas, so the vacuum chamber may slow heat, or resist sixteen times as an insulator. Insulation may cover outside of device.

What I claim is:

In a vehicle including an engine, an exhaust manifold connected to said engine and a refrigeration circuit including a compressor, a turbine, a condenser and an evaporator, the improvement comprising a case of heat storage material connected between said compressor and said turbine and including first passage means to provide compressed refrigerant gas flow therethrough, second passage means in said case and connected to said exhaust manifold to receive hot exhaust gas therefrom to thereby heat said storage material and in turn super-heat said compressed refrigerant gas, and said case further provided with a sealed partial vacuum chamber between said first and second passage means for limiting the flow of heat from said second passage means to the compressed refrigerant gas in said first passage means.

References Cited by the Examiner
UNITED STATES PATENTS

| | | | |
|---|---|---|---|
| 2,737,031 | 3/1956 | Wulle | 62—238 |
| 2,820,348 | 1/1958 | Sauter | 62—238 |
| 3,147,744 | 9/1964 | Percival | 122—35 X |

ROBERT A. O'LEARY, *Primary Examiner.*

M. A. ANTONAKAS, *Assistant Examiner.*